(12) United States Patent
Gloekler et al.

(10) Patent No.: US 8,719,607 B2
(45) Date of Patent: May 6, 2014

(54) ADVANCED PSTATE STRUCTURE WITH FREQUENCY COMPUTATION

(75) Inventors: Tilman Gloekler, Gaertringen (DE);
Cedric Lichtenau, Stuttgart (DE);
Thomas Pflueger, Leinfelden (DE);
Gregory S. Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/308,884

(22) Filed: Dec. 1, 2011

(65) Prior Publication Data
US 2013/0145188 A1 Jun. 6, 2013

(51) Int. Cl.
*G06F 1/08* (2006.01)
*G06F 1/32* (2006.01)

(52) U.S. Cl.
CPC .................................. *G06F 1/3293* (2013.01)
USPC ........................................ 713/322; 340/500

(58) Field of Classification Search
USPC ......... 713/300, 310, 320, 321, 322, 323, 324, 713/330, 340, 375
See application file for complete search history.

(56) References Cited

U.S. PATENT DOCUMENTS

| | | | |
|---|---|---|---|
| 6,988,211 B2 | 1/2006 | Cline et al. | |
| 7,389,440 B2 | 6/2008 | Bailey et al. | |
| 2003/0065960 A1* | 4/2003 | Rusu et al. | 713/300 |
| 2004/0179576 A1* | 9/2004 | Bowden et al. | 374/163 |
| 2004/0210787 A1* | 10/2004 | Cox et al. | 713/322 |
| 2006/0026447 A1 | 2/2006 | Naveh et al. | |
| 2008/0040622 A1* | 2/2008 | Duran et al. | 713/300 |
| 2008/0104425 A1 | 5/2008 | Gunther et al. | |
| 2009/0132835 A1 | 5/2009 | Ehmann | |
| 2009/0199020 A1 | 8/2009 | Bose et al. | |
| 2010/0268968 A1* | 10/2010 | Ghiasi et al. | 713/300 |

OTHER PUBLICATIONS

Bircher, W. L. et al., "Analysis of Dynamic Power Management on Multi-Core Processors", ICS'08 Proceedings of the 22nd Annual International Conference on Supercomputing; Jun. 7-12, 2008, pp. 327-338.
Gloekler, Tilman et al., "Processing system for power management in multi-core processors and method for operating the same", EP Application No. EP10168451.2, filed Jul. 5, 2010, 28 pages.
Hanson, Heather et al., "Power, Performance, and Thermal Management for High-Performance Systems", International Parallel and Distributed Processing Symposium (IPDPS 2007), Long Beach, California, Mar. 26-30, 2007, 8 pages.

* cited by examiner

*Primary Examiner* — Kim Huynh
*Assistant Examiner* — Paul J Yen
(74) *Attorney, Agent, or Firm* — Francis Lammes; Stephen J. Walder, Jr.; Libby Z. Toub (57) ABSTRACT

A mechanism for power management of processors using Pstates is provided. In a chiplet of a processor in a data processing system, a request is received to change a Pstate from a current Pstate to a requested Pstate. A determination is made as to whether the requested Pstate is less than or equal to a maximum Pstate. Responsive to the requested Pstate being less than or equal to the maximum Pstate, a frequency associated with the requested Pstate is computed thereby forming a computed frequency. An operating frequency of the chiplet is then adjusted to the computed frequency without involvement from a central power control entity.

17 Claims, 4 Drawing Sheets

ADVANCED PSTATE STRUCTURE WITH FREQUENCY COMPUTATION

BACKGROUND

The present application relates generally to an improved data processing apparatus and method and more specifically to mechanisms for power management of microprocessors with "Pstates," which represent an abstraction of frequencies and voltages.

Pstates are typically controlled by an operating system or hypervisor and are used to request a desired performance level for one microprocessor core or a set of microprocessor cores. In order to obtain optimum savings based on a Pstate request, hardware automatically switches not only the frequency of the core, but also the voltage, if possible, in order to save power. For cost reasons, many microprocessor cores on a chip share a single voltage plane and a single voltage controller. Further, a central power control entity (CPCE) decides which voltage to use. If the frequency and voltage is organized in one centralized table of the chip, the action of changing a Pstate requires interaction between the individual microprocessor cores and the CPGE. Such an approach does not scale well with the number of cores due to communication and processing overhead and that such an approach introduces unnecessary delays that result in suboptimal power savings.

SUMMARY

In one illustrative embodiment, a method, in a data processing system, is provided for power management of processors using Pstates. The illustrative embodiment receives a request to change a Pstate from a current Pstate to a requested Pstate in a chiplet of a processor in the data processing system. The illustrative embodiment determines whether the requested Pstate is less than or equal to a maximum Pstate. The illustrative embodiment computes a frequency associated with the requested Pstate in response to the requested Pstate being less than or equal to the maximum Pstate, thereby forming a computed frequency. The illustrative embodiment adjusts an operating frequency of the chiplet to the computed frequency without involvement from a central power control entity.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

As stated previously, if the frequency and voltage is organized in one centralized table of the chip, the action of changing a Pstate requires interaction between individual microprocessor cores and a central power control entity (CPCE) each and every time a microprocessor core wants to change its Pstate. Such an approach does not scale well with the number of cores due to communication and processing overhead and such an approach introduces unnecessary delays that result in suboptimal power savings.

The illustrative embodiments provide an advanced Pstate mechanism that allows chiplets with or without processor cores to adjust their own Pstate as long as a maximum Pstate is not violated, which is associated to an externally established voltage and which represents a safety bound that must not be exceeded. Each chiplet associated with a processor core on a processor chip is configured with the advanced Pstate mechanism that determines whether a requested Pstate is less than or equal to a maximum Pstate. If the requested Pstate is not greater than the maximum Pstate, then the advanced Pstate mechanism raises or lowers the operating frequency of the processor core without involvement from a central control mechanism. It is only when the requested Pstate is greater than the maximum Pstate, that the advanced Pstate mechanism is dependent on a central power control entity (CPCE).

Figure 1:
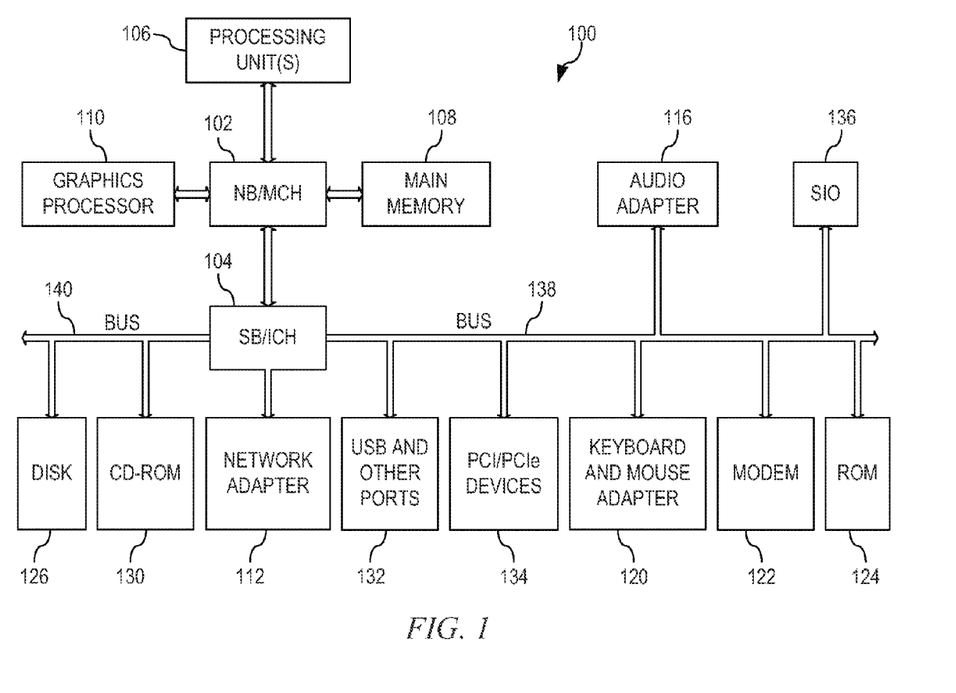
FIG. 1 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments. FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

With reference now to FIG. 1, a block diagram of an example data processing system is shown in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft Windows 7 (Microsoft and Windows are trademarks of Microsoft Corporation in the United States, other countries, or both). An Object-oriented programming system, such as the Java programming system, may run in conjunction with the operating system and provides calls to the operating system from Java programs or applications executing on data processing system 100 (Java is a trademark of Oracle and/or its affiliates).

As a server, data processing system 100 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Again, the illustrative embodiments provide an advanced Pstate mechanism that allows chiplets with or without processor cores to adjust their own Pstate as long as a maximum Pstate is not violated. Each chiplet comes with its own clock frequency generator, such as a phase locked loop, a digital phase locked loop, or the like, and is configured with the advanced Pstate mechanism that determines whether a requested Pstate is less than or equal to a maximum Pstate. If the requested Pstate is not greater than the maximum Pstate, then the advanced Pstate mechanism raises or lowers the operating frequency of the processor core without involvement from a central control mechanism. It is only when the requested Pstate is greater than the maximum Pstate, that the advanced Pstate mechanism is dependent on a central power control entity (CPCE).

Figure 2:
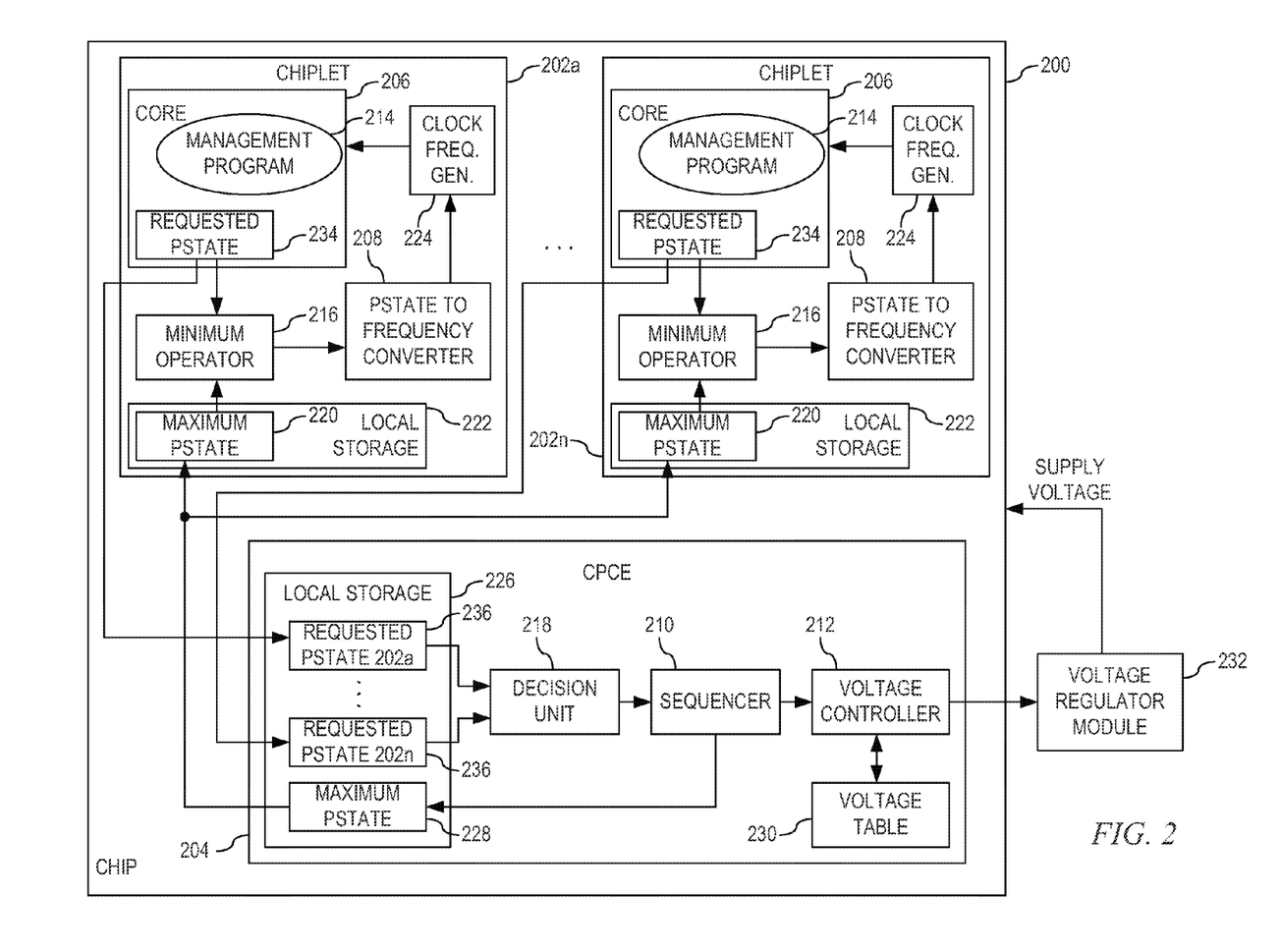
FIG. 2 depicts an exemplary logical view of a global Pstate architecture for a processor chip with a number N of processor cores that share a single supply voltage plane in accordance with an illustrative embodiment.

FIG. 2 depicts an exemplary logical view of a global Pstate architecture for a processor chip with a number N of processor cores that share a single supply voltage plane in accordance with an illustrative embodiment. A Pstate is both a frequency and voltage operating point. Processor chip 200 may be a processor chip such as processing unit 106 of FIG. 1. Processor chip 200 may be logically separated into the following functional components: chiplets 202a through 202n, and central power control entity (CPCE) 204. Although chiplets 202a through 202n are shown by example, any type and number of chiplets may be supported in processor chip 200. Each of chiplets 202a through 202n comprise processor core 206, Pstate to frequency converter 208, and clock frequency generation unit 224, which may be implemented by a regular phase locked loop, a digital phase locked loop, or the like. CPCE 204 comprises sequencer 210 and voltage controller 212.

Each processor core 206 within chiplets 202a through 202n may request a change in Pstate through management program 214, which may be an operating system, hypervisor, or the like, operating on processor core 206 sending a Pstate request signal 234 to minimum operator 216 as well as decision unit 218 in CPCE 204. Upon receiving the request to change Pstate, minimum operator 216 computes a minimum of the requested Pstate and a maximum Pstate in maximum Pstate register 220 stored in local storage 222. If the requested Pstate is smaller or equal to the maximum Pstate, then Pstate to frequency converter 208 computes a frequency that is associated with the Pstate using the following equation:

$$f(N) = \text{Fop\_min} + (\text{Fop\_max} - \text{Fop\_min}) * N * \text{stepfactor}$$

where N is the requested Pstate, Fop_min is a configurable minimum operating frequency of the processor, Fop_max is a configurable maximum operating frequency of the processor, and stepfactor is a ratio of predetermined available Pstates, for example, the stepfactor would be $1/32$ if there are 32 available Pstates and N would be an integer number in the range 0 to 31 for this example.

Using this equation, higher/lower Pstates always represent an abstraction for higher/tower performance and higher/lower power states of processor core. The bounds for this equation (Fop_min and Fop_max) are predetermined as a function of the user policy and chip characterization results and may be regarded as constants while operating the chip in functional mode. Thus, each Pstate to frequency converter 208 may compute the Pstate frequency locally within its individual bounds of chiplets 202a through 202n. If the requested Pstate results in a lower frequency than a current operating frequency, then Pstate to frequency converter 208 sends a signal to on-chiplet clock frequency generation unit 224 in order to lower the operating frequency of processor core 206 to the newly calculated frequency instantaneously, for example, within 10 nanoseconds to 100 microseconds. If the requested Pstate results in a higher frequency than the current operating frequency but is still less than or equal to the maximum Pstate, then Pstate to frequency converter 208 sends a signal to on-chiplet clock frequency generation unit 224 in order to raise the operating frequency of processor core 206 to the newly calculated frequency instantaneously, for example, within 10 nanoseconds to 100 microseconds.

If the minimum operator 216 determines that the maximum Pstate is smaller, then minimum operator 216 waits for the maximum Pstate in maximum Pstate register 220 to be updated before increasing the operating frequency. In order for the maximum Pstate to be increased, the Pstate request signal, previously sent by management program 214 on processor 206, is received by decision unit 218 in CPCE 204. Decision unit 218 may be implemented as a maximum operator, a complex algorithm, or the like, so that a desired Pstate may be determined that is legal given the currently established external supply voltage.

Decision unit 218 determines the desired Pstate from all requested Pstates from all management programs 214 on chiplets 202a through 202n. Decision unit 218 may determine the desired Pstate from all requested Pstates, by, for example, using a maximum operator that identifies a maximum requested Pstate out of all of the requested Pstates. Alternatively, decision unit 218 may determine the desired Pstate from all requested Pstates based on identifying a highest requested Pstate that does not exceed a predetermined Pstate based on user preferences. That is, decision unit 218 may make a determination of a desired Pstate from all requested Pstates based on a plurality of different factors without departing from the spirit and scope of the invention. This determination may be performed at regular intervals or upon receiving an updated Pstate request signal. That is, received Pstate requests for each of chiplets 202a through 202n may be stored in respective Pstate registers 236 in local storage 226 and a previously received and stored Pstate request may be replaced by a newly requested Pstate upon receipt of the Pstate request for the specific one of chiplets 202a through 202n.

Figure 3:
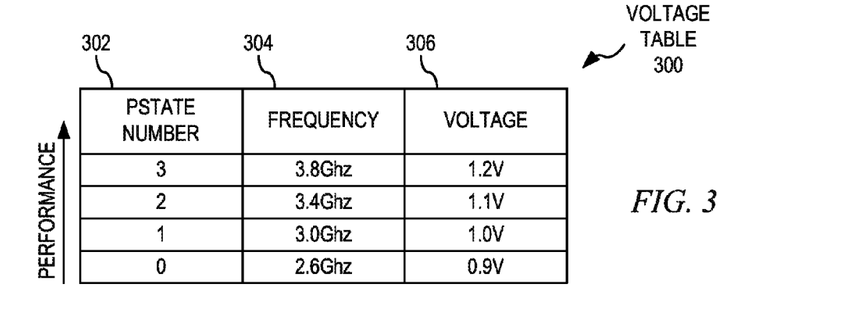
FIG. 3 depicts an exemplary voltage table that may be used by a voltage controller in accordance with an illustrative embodiment.

Once the desired Pstate is determined by the decision unit 218, sequencer 210 determines whether the determined maximum Pstate is less than, greater than, or equal to a current maximum Pstate in maximum Pstate register 228. If the desired Pstate is equal to the current maximum Pstate, then no action is performed by sequencer 210. If the desired Pstate is less than the current maximum Pstate and the maximum Pstate needs to be decreased, sequencer 210 first updates the current maximum Pstate in maximum Pstate register 228 to the new lower maximum Pstate. Then sequencer 210 lowers the voltage by sending the new lower Pstate to voltage controller 212. Voltage controller 212 looks up the voltage that is associated to the new lower Pstate in voltage table 230, an example of which is shown in FIG. 3. Once voltage controller 212 identifies the new voltage, voltage controller 212 sends a signal to off-chip voltage regulator module 232, where voltage regulator module 232 lowers the voltage for processor chip 220.

If the desired Pstate is greater than the current maximum Pstate and the maximum Pstate needs to be increased, sequencer 210 first increases the voltage by sending the new higher Pstate to voltage controller 212. Voltage controller 212 looks up the voltage that is associated to the new higher Pstate in voltage table 230. Once voltage controller 212 identifies the new voltage, voltage controller 212 sends a signal to off-chip voltage regulator module 232, where voltage regulator module 232 raises the voltage for processor chip 220. Then sequencer 210 updates the current maximum Pstate in maximum Pstate register 228 to the new higher maximum Pstate.

Regardless of whether maximum Pstate register 228 is updated with a new higher maximum Pstate or a new lower maximum Pstate, once maximum Pstate register 228 is updated, CPCE 204 automatically updates the maximum Pstate maximum Pstate register 220 in each of chiplets 202a through 202n. Once themaximum Pstate is updated, then minimum operator 216 is able to determine whether the requested Pstate is less than or equal to a maximum Pstate in maximum Pstate register 220 and Pstate to frequency converter 208 is able to compute a new frequency and raise or lower the operating frequency to the newly calculated frequency. The operation in chiplets 202a through 202n and CPCE 204 is then performed recursively as long as processor chip 200 is active.

FIG. 3 depicts an exemplary voltage table that may be used by a voltage controller, such as voltage controller 212 of FIG. 2, in accordance with an illustrative embodiment. Voltage table 300 comprises Pstate number field 302, reference frequency field 304 and voltage field 306. As discussed in FIG. 2, a voltage controller looks up the voltage that is associated to the new Pstate voltage table 300 based on Pstate number field 302. Upon identifying the Pstate in Pstate number field 302, the voltage controller identifies the voltage associated with that Pstate in voltage field 306. The voltage controller then sends the identified voltage to a voltage regulator module that changes the voltage of the processor chip accordingly. As is illustrated in voltage table 300, as the Pstate increases so does the frequency, thus the performance of the processor chip is increased.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is nota computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RE), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
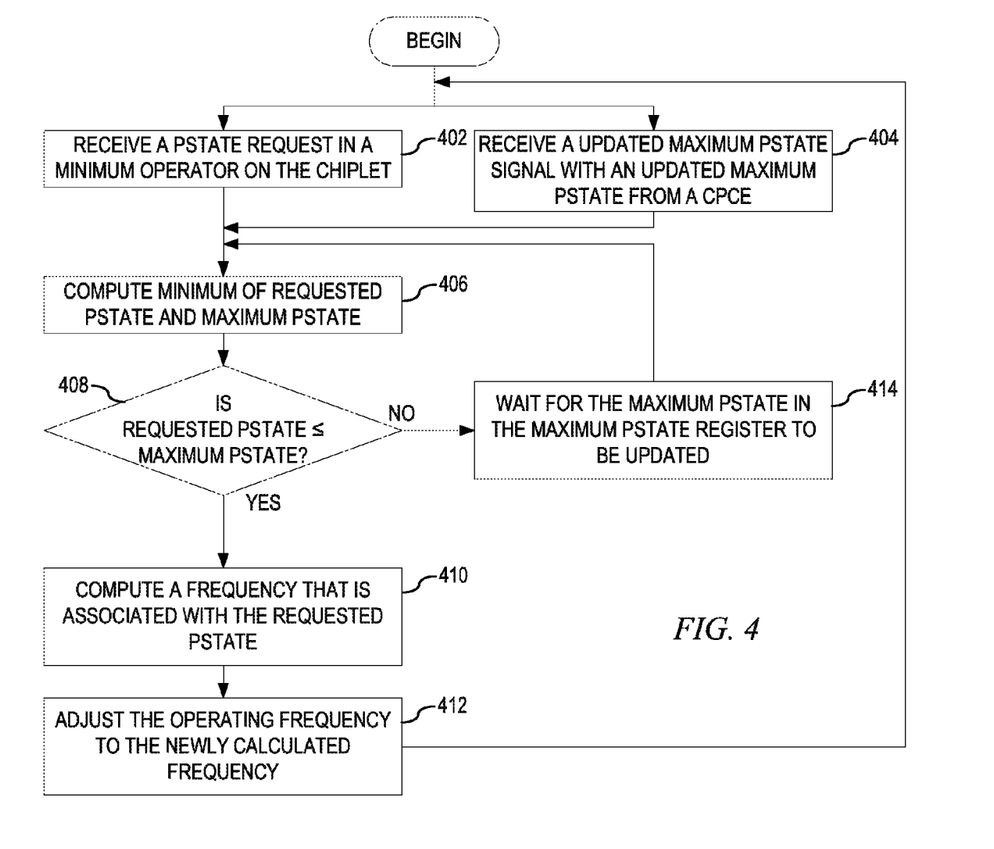
FIG. 4 depicts an exemplary flowchart of the operation performed in a chiplet in accordance with an illustrative embodiment.

FIG. 4 depicts an exemplary flowchart of the operation performed in a chiplet in accordance with an illustrative embodiment. As the operation begins, minimum operator receives a Pstate request signal from a management program associated with a processor core on the chiplet requesting anew Pstate (step 402) or the minimum operator receives a updated maximum Pstate signal with an updated maximum Pstate from a central power control entity (CPCE), which is then updated in a maximum Pstate register (step 404). Upon receiving the request to change Pstate or the updated maximum Pstate, the minimum operator computes a minimum of the requested Pstate and a maximum Pstate in the maximum Pstate register (step 406).

If at step 408 the requested Pstate is smaller or is equal to the maximum Pstate, then a Pstate to frequency converter computes a frequency that is associated with the requested Pstate (step 410) using the following equation:

$$f(N) = \text{Fop\_min} + (\text{Fop\_max} - \text{Fop\_min}) * N * \text{stepfactor}$$

where N is the requested Pstate, Fop_min is a configurable minimum operating frequency of an associated core in the chiplet of the processor, Fop_max is a configurable maximum operating frequency of the associated core in the processor, and stepfactor is a ratio of predetermined available Pstates, for example, the stepfactor would be 1/32 if there are 32 available Pstates.

The Pstate to frequency converter then sends a signal to an on-chiplet dock frequency generation unit in order to adjust the operating frequency to the newly calculated frequency instantaneously, for example, within 10 nanoseconds to 100 microseconds (step 4(2) with the operation returning to steps 402 and 404 thereafter. If at step 408 the minimum operator determines that the maximum Pstate is smaller, then the minimum operator waits for the maximum Pstate in the maximum Pstate register to be updated (step 414). Once the maximum Pstate in the maximum Pstate register is updated, the operation returns to step 406.

Figure 5:
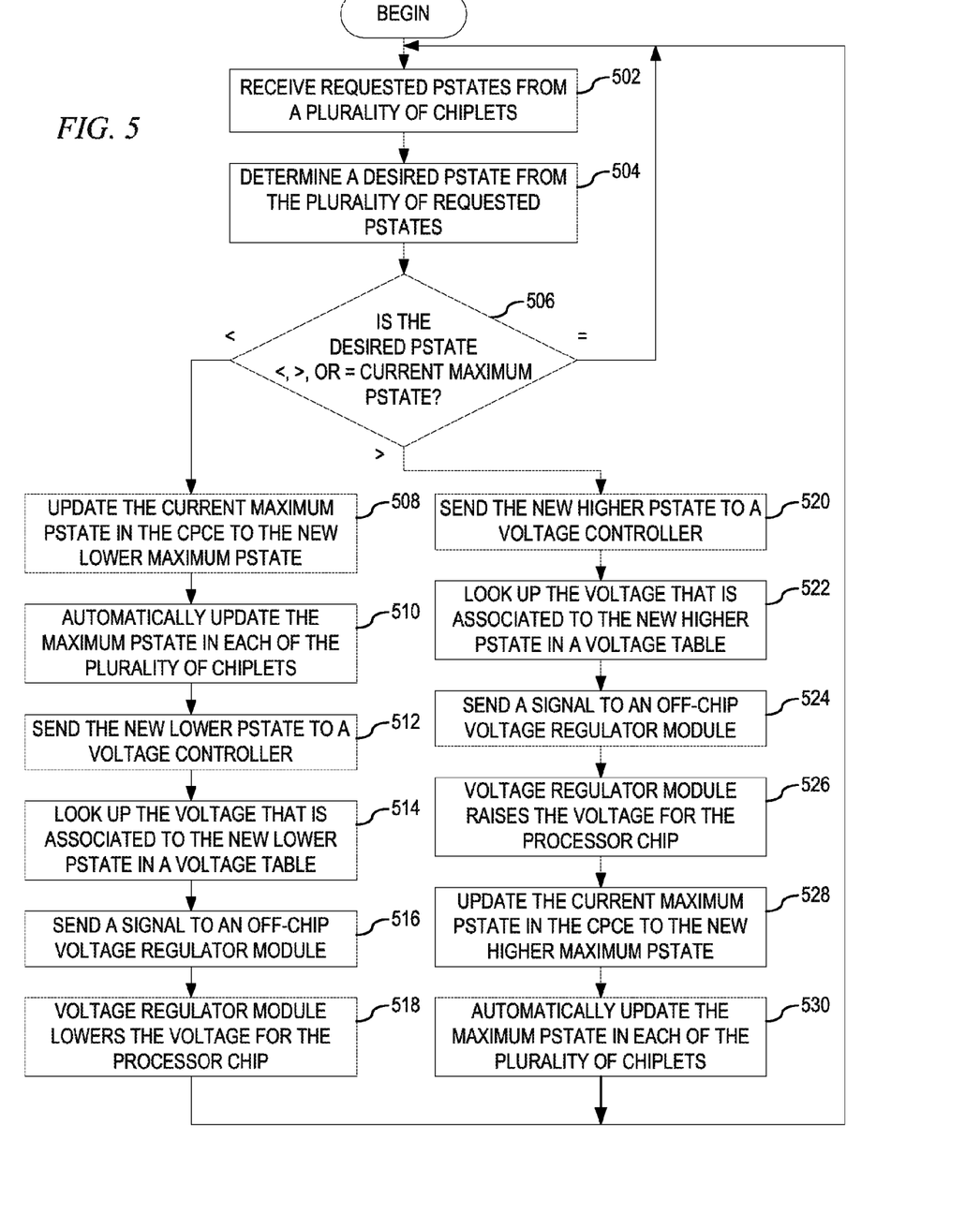
FIG. 5 depicts an exemplary flowchart of the operation performed in a central power control entity (CPCE) in accordance with an illustrative embodiment.

FIG. 5 depicts an exemplary flowchart of the operation performed in a central power control entity (CPCE) in accordance with an illustrative embodiment. As the operation begins, a decision unit in the CPCE receives requested Pstates from a plurality of chiplets (step 502). The decision unit then determines a desired Pstate from the plurality of requested Pstates (step 504). This determination may be performed at regular intervals or upon receiving an updated Pstate request signal. That is, the received Pstate requests for each of the plurality of chiplets may be stored in a local storage and a previously received and stored Pstate request may be replaced by a newly requested Pstate upon receipt of the Pstate request for the chiplet.

Once the desired Pstate is determined, a sequencer determines whether this desired Pstate is less than, greater than, or equal to a current maximum Pstate in maximum Pstate register (step 506). If at step 506 the desired Pstate is equal to the current maximum Pstate, then the operation returns to step 502. If at step 506 the desired Pstate is less than the current maximum Pstate and the maximum Pstate needs to be decreased, the sequencer updates the current maximum Pstate in the maximum Pstate register in the CPCE to the new lower maximum Pstate (step 508). The sequencer then automatically updates the maximum Pstate in a maximum Pstate register in each of the plurality chiplets (step 510).

The sequencer then lowers the voltage by sending the new lower Pstate to a voltage controller (step 512). The voltage controller looks up the voltage that is associated to the new lower Pstate in a voltage table (step 514). Once the voltage controller identifies the new voltage, the voltage controller sends a signal to an off-chip voltage regulator module (step 516), where the voltage regulator module towers the voltage for the processor chip (step 518), with the operation returning to step 502 thereafter.

If at step 506 the desired Pstate is greater than the current maximum Pstate and the maximum Pstate needs to be increased, the sequencer increases the voltage by sending the new higher Pstate to the voltage controller (step 520). The voltage controller looks up the voltage that is associated to the new higher Pstate in the voltage table (step 522). Once the voltage controller identifies the new voltage, the voltage controller sends a signal to the off-chip voltage regulator module (step 524), where the voltage regulator module raises the voltage for the processor chip (step 526). The sequencer then updates the current maximum Pstate in the maximum Pstate register in the CPCE to the new higher maximum Pstate (step 528). The sequencer then automatically updates the maximum Pstate in a maximum Pstate register in each of the plurality of chiplets (step 530), with the operation returning to step 502 thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for allowing chiplets with or without processor cores to adjust their own Pstate as long as a maximum Pstate is not violated. Each chiplet comes with its own clock frequency generator, such as a phase locked loop, a digital phase locked loop, or the like, and is configured with the advanced Pstate mechanism that determines whether a requested Pstate is less than or equal to a maximum Pstate. If the requested Pstate is not greater than the maximum Pstate, then the advanced Pstate mechanism raises or lowers the operating frequency of the processor core without involvement from a central control mechanism. It is only when the requested Pstate is greater than the maximum Pstate, when the advanced Pstate mechanism is dependent on a central power control entity (CPCE).

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for power management of processors using Pstates, the method comprising:
in a chiplet of a processor in the data processing system, receiving a request to change a Pstate from a current Pstate to a requested Pstate;
determining whether the requested Pstate is less than or equal to a maximum Pstate;
responsive to the requested Pstate being less than or equal to the maximum Pstate, computing a frequency associated with the requested Pstate thereby forming a computed frequency, wherein the computed frequency is computed using the following equation:

$$f(N) = \text{Fop\_min} + (\text{Fop\_max} - \text{Fop\_min}) * N * \text{stepfactor}$$

where N is the requested Pstate, Fop_min is a configurable minimum operating frequency of an associated core in the chiplet of the processor, Fop_max is a configurable maximum operating frequency of the associated core in the processor, and stepfactor is a ratio of predetermined available Pstates, for example, the stepfactor would be 1/32 if the are 32 available Pstates; and adjusting an operating frequency of the chiplet to the computed frequency without involvement from a central power control entity.

2. The method of claim 1, further comprising:
responsive to the requested Pstate being greater than the maximum Pstate, waiting for the maximum Pstate to be updated before computing a frequency associated with the requested Pstate thereby forming a computed frequency; and adjusting an operating frequency to the computed frequency.

3. The method of claim 1, further comprising:
in a central power control entity of a processor in the data processing system, receiving a plurality of requested Pstates from a plurality of chiplets in the data processing system;
determining a desired Pstate from the plurality of requested Pstates;
determining whether the desired Pstate is less than, greater than, or equal to a current maximum Pstate; and
responsive to the desired Pstate being equal to the current maximum Pstate, keeping the current maximum Pstate at its current value and keeping a current voltage for the processor at its current value.

4. The method of claim 3, further comprising:
responsive to the desired Pstate being less than the current maximum Pstate, updating the current maximum to a new lower Pstate;
automatically updating the maximum Pstate in each of the plurality of chiplets to the new lower Pstate; and
lowering the voltage for the processor.

5. The method of claim 4, wherein the voltage is lowered by the method comprising:
sending the new lower Pstate to a voltage controller;
looking up a voltage associated to the new lower Pstate in a voltage table; and
sending a signal to an off-chip voltage regulator module, wherein the off-chip voltage regulator module lowers the voltage for the processor.

6. The method of claim 3, further comprising:
responsive to the desired Pstate being greater than the current maximum Pstate, raising the voltage for the processor;
updating the current maximum to a new higher Pstate; and
automatically updating the maximum Pstate in each of the plurality of chiplets to the new higher Pstate.

7. The method of claim 6, wherein the voltage is raised by the method comprising:
sending the new higher Pstate to a voltage controller;
looking up a voltage associated to the new higher Pstate in a voltage table; and
sending a signal to an off-chip voltage regulator module, wherein the off-chip voltage regulator module raises the voltage for the processor.

8. A computer program product comprising a non-transitory computer readable storage medium having a computer readable program stored therein, wherein the computer readable program, when executed on a computing device, causes the computing device to:
in a chiplet of a processor in a data processing system, receive a request to change a Pstate from a current Pstate to a requested Pstate;
determine whether the requested Pstate is less than or equal to a maximum Pstate;
responsive to the requested Pstate being less than or equal to the maximum Pstate, compute a frequency associated with the requested Pstate thereby forming a computed frequency, wherein the computed frequency is computed using the following equation:

$$f(N) = \text{Fop\_min} + (\text{Fop\_max} - \text{Fop\_min}) * N * \text{stepfactor}$$

where N is the requested Pstate, Fop_min is a configurable minimum operating frequency of an associated core in the chiplet of the processor, Fop_max is a configurable maximum operating frequency of the associated core in the processor, and stepfactor is a ratio of predetermined available Pstates, for example, the stepfactor would be $\frac{1}{32}$ if there are 32 available Pstates; and
adjust an operating frequency of the chiplet to the computed frequency without involvement from a central power control entity.

9. The computer program product of claim 8, wherein the computer readable program further causes the computing device to:
responsive to the requested Pstate being greater than the maximum Pstate, wait for the maximum Pstate to be updated before computing a frequency associated with the requested Pstate thereby forming a computed frequency; and adjusting an operating frequency to the computed frequency.

10. The computer program product of claim 8, wherein the computer readable program further causes the computing device to:
in the central power control entity of a processor in the data processing system, receive a plurality of requested Pstates from a plurality of chiplets in the data processing system;
determine a desired Pstate from the plurality of requested Pstates;
determine whether the desired Pstate is less than, greater than, or equal to a current maximum Pstate; and
responsive to the desired Pstate being equal to the current maximum Pstate, keep the current maximum Pstate at its current value and keeping a current voltage for the processor at its current value.

11. The computer program product of claim 10, wherein the computer readable program further causes the computing device to:
responsive to the desired Pstate being less than the current maximum Pstate, update the current maximum to a new lower Pstate;
automatically update the maximum Pstate in each of the plurality of chiplets to the new lower Pstate; and
lower the voltage for the processor, wherein the voltage is lowered by the computer readable program further causing the computing device to:
send the new lower Pstate to a voltage controller;
look up a voltage associated to the new lower Pstate in a voltage table; and
send a signal to an off-chip voltage regulator module, wherein the off-chip voltage regulator module lowers the voltage for the processor.

12. The computer program product of claim 10, wherein the computer readable program further causes the computing device to:
responsive to the desired Pstate being greater than the current maximum Pstate, raise the voltage for the processor, wherein the voltage is raised by the computer readable program further causing the computing device to:
send the new higher Pstate to a voltage controller;
look up a voltage associated to the new higher Pstate in a voltage table; and send a signal to an off-chip voltage regulator module, wherein the off-chip voltage regulator module raises the voltage for the processor;
update the current maximum to a new higher Pstate; and
automatically update the maximum Pstate in each of the plurality of chiplets to the new higher Pstate.

13. An apparatus, comprising:
a processor; and
at least one chiplet within the processor;
a first memory coupled to the chiplet, wherein the first memory comprises instructions which, when executed by the chiplet, cause the chiplet to:
receive a request to change a Pstate from a current Pstate to a requested Pstate;
determine whether the requested Pstate is less than or equal to a maximum Pstate;
responsive to the requested Pstate being less than or equal to the maximum Pstate, compute a frequency associated with the requested Pstate thereby forming a computed frequency, wherein the computed frequency is computed using the following equation:

$$f(N) = \text{Fop\_min} + (\text{Fop\_max} - \text{Fop\_min}) * N * \text{stepfactor}$$

where N is the requested Pstate, Fop_min is a configurable minimum operating frequency of associated core in the chiplet of the processor, Fop_max is a configurable maximum operating frequency of the associated core in the processor, and stepfactor is a ratio of predetermined available Pstates, for example, the stepfactor would be 1/32 if there are 32 available Pstates; and
adjust an operating frequency of the chiplet to the computed frequency without involvement from a central power control entity within the processor.

14. The apparatus of claim 13, wherein the instructions further cause the chiplet to:
responsive to the requested Pstate being greater than the maximum Pstate, wait for the maximum Pstate to be updated before computing a frequency associated with the requested Pstate thereby forming a computed frequency; and adjusting an operating frequency to the computed frequency.

15. The apparatus of claim 13, further comprising:
a second memory coupled to the central power control entity, wherein the second memory comprises instructions which, when executed by the central power control entity, cause the central power control entity to:
receive a plurality of requested Pstates from a plurality of chiplets in the data processing system;
determine a desired Pstate from the plurality of requested Pstates;
determine whether the desired Pstate is less than, greater than, or equal a current maximum Pstate; and
responsive to the desired Pstate being equal to the current maximum Pstate, keep the current maximum Pstate at its current value and keeping a current voltage for the processor at its current value.

16. The apparatus of claim 15, wherein the instructions further cause the central power control entity to:
responsive to the desired Pstate being less than the current maximum Pstate, update the current maximum to a new lower Pstate;
automatically update the maximum Pstate in each of the plurality of chiplets to the new lower Pstate; and
lower the voltage for the processor, wherein the voltage is lowered by the instructions further causing the central power control entity to:
send the new lower Pstate to a voltage controller;
look up a voltage associated to the new lower Pstate in a voltage table; and
send a signal to an off-chip voltage regulator module, wherein the off-chip voltage regulator module lowers the voltage for the processor.

17. The apparatus of claim 15, wherein the instructions further cause the central power control entity to:
responsive to the desired Pstate being greater than the current maximum Pstate, raise the voltage for the processor, wherein the voltage is raised by the instructions further causing the central power control entity to:
send the new higher Pstate to a voltage controller;
look up a voltage associated to the new higher Pstate in a voltage table; and
send a signal to an off-chip voltage regulator module, wherein the off-chip voltage regulator module raises the voltage for the processor;
update the current maximum to a new higher Pstate; and
automatically update the maximum Pstate in each of the plurality of chaplets to the new higher Pstate.

* * * * *